(12) United States Patent
Barsun et al.

(10) Patent No.: US 7,382,624 B2
(45) Date of Patent: Jun. 3, 2008

(54) POWER SUPPLY INCLUDING MULTIPLE AC RECEPTACLES

(75) Inventors: Stephan Karl Barsun, Sacramento, CA (US); Robert William Dobbs, Granite Bay, CA (US); Jeffrey Lee Evans, Meadow Vista, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 410 days.

(21) Appl. No.: 10/971,375

(22) Filed: Oct. 22, 2004

(65) Prior Publication Data

US 2006/0087872 A1   Apr. 27, 2006

(51) Int. Cl.
*H05K 7/10* (2006.01)
*H05K 7/14* (2006.01)

(52) U.S. Cl. ............... 361/730; 361/729; 361/752; 361/796; 361/797; 174/520; 174/50; 439/76.1; 363/146

(58) Field of Classification Search ........ 361/728–730, 361/826, 827, 788, 796, 600, 752, 679, 686, 361/797; 174/150, 50, 520; 439/76.1; 363/142, 363/146; 211/41.17
See application file for complete search history.

(56) References Cited

U.S. PATENT DOCUMENTS

| | | | |
|---|---|---|---|
| 5,534,664 A * | 7/1996 | Fearing et al. ............. 174/50 |
| 5,567,176 A * | 10/1996 | Chiou ....................... 439/500 |
| 5,587,881 A * | 12/1996 | Wang ........................ 361/695 |
| 5,973,947 A * | 10/1999 | Shih .......................... 363/144 |
| 6,137,706 A | 10/2000 | Nesbitt et al. |
| 6,285,546 B1 * | 9/2001 | Watarai et al. ............ 361/695 |
| 6,293,828 B1 * | 9/2001 | Colver et al. ............. 439/680 |
| 6,330,176 B1 | 12/2001 | Thrap et al. |
| 6,504,730 B1 * | 1/2003 | Cooney et al. ............ 361/826 |
| 6,563,721 B1 | 5/2003 | Rapeanu |
| 6,665,189 B1 * | 12/2003 | Lebo ......................... 361/730 |
| 6,731,507 B2 * | 5/2004 | Varghese et al. .......... 361/725 |
| 6,741,466 B1 * | 5/2004 | Lebo ......................... 361/687 |
| 6,833,996 B2 * | 12/2004 | Haworth .................... 361/730 |
| 6,847,528 B2 * | 1/2005 | Sucharczuk et al. ....... 361/796 |
| 6,878,874 B2 * | 4/2005 | Osborn et al. .............. 174/50 |
| 7,102,887 B2 * | 9/2006 | Blackwell .................. 361/695 |
| 7,109,413 B2 * | 9/2006 | Chen .......................... 174/50 |
| 2003/0023888 A1 | 1/2003 | Smith et al. |
| 2003/0067224 A1 | 4/2003 | Tai |

FOREIGN PATENT DOCUMENTS

GB    2322972 A    9/1989

* cited by examiner

*Primary Examiner*—Tuan Dinh
*Assistant Examiner*—Dameon E Levi

(57) ABSTRACT

A power supply comprises a chassis, a plurality of alternating current (AC) power receptacles formed into the chassis, and power supply circuit contained within the chassis and selectively coupled to ones of the plurality of AC power receptacles.

14 Claims, 9 Drawing Sheets

US 7,382,624 B2

POWER SUPPLY INCLUDING MULTIPLE AC RECEPTACLES

BACKGROUND OF THE INVENTION

Economic and competitive conditions bring incentive for business organizations to improve operations to reduce costs, including inventory costs. Operations can be improved in fields of advancing technology by focusing design and development resources in areas that improve competitive advantage while leveraging costs of other product aspects across multiple products.

Cost leveraging enables aggregation of component demand across possibly many products leading to improved economies of scale, aggregate volume discounts, and reduction of supplier prices. Component leveraging also can reduce supply chain, handling, and inventory costs since component sorting, labeling, and tracking are reduced.

Component leveraging can reduce costs in other areas. For example, usage of a particular component in multiple products can avoid duplication of research and development costs. A reduction in the number of components can reduce the incidence of confusion and errors by inadvertently including an incompatible component in a product.

In a high-volume producer, inventory handling and tracking costs can be reduced by millions of dollars simply by aggregating components among multiple products.

SUMMARY

In accordance with an embodiment of an apparatus for usage in an electronic system, a power supply comprises a chassis, a plurality of alternating current (AC) power receptacles formed into the chassis, and power supply circuit contained within the chassis and selectively coupled to ones of the plurality of AC power receptacles.

BRIEF DESCRIPTION OF THE DRAWINGS

Embodiments of the invention relating to both structure and method of operation, may best be understood by referring to the following description and accompanying drawings whereby.

DETAILED DESCRIPTION

A single power supply model can be used among multiple electronic products by including multiple alternating current (AC) input receptacles on a single component, thereby enabling increased flexibility in power supply placement. The illustrative structure further enables the power supply to be used in a first system type when inserted from the front and used in a second system type when inserted from the rear. By aggregating a power supply among multiple electronic systems, inventory costs, tooling costs, and engineering expenditure can be reduced. The multiple AC input receptacle power supply has improved adaptability to multiple products including a wide breadth of different product types.

The multiple AC input receptacle power supply also improves economies of scale on supply purchases, reducing costs in the supply chain, and reducing the number of parts that are stocked.

In some embodiments, the AC input receptacles are positioned on different sides of a power supply chassis.

Figure 1A:
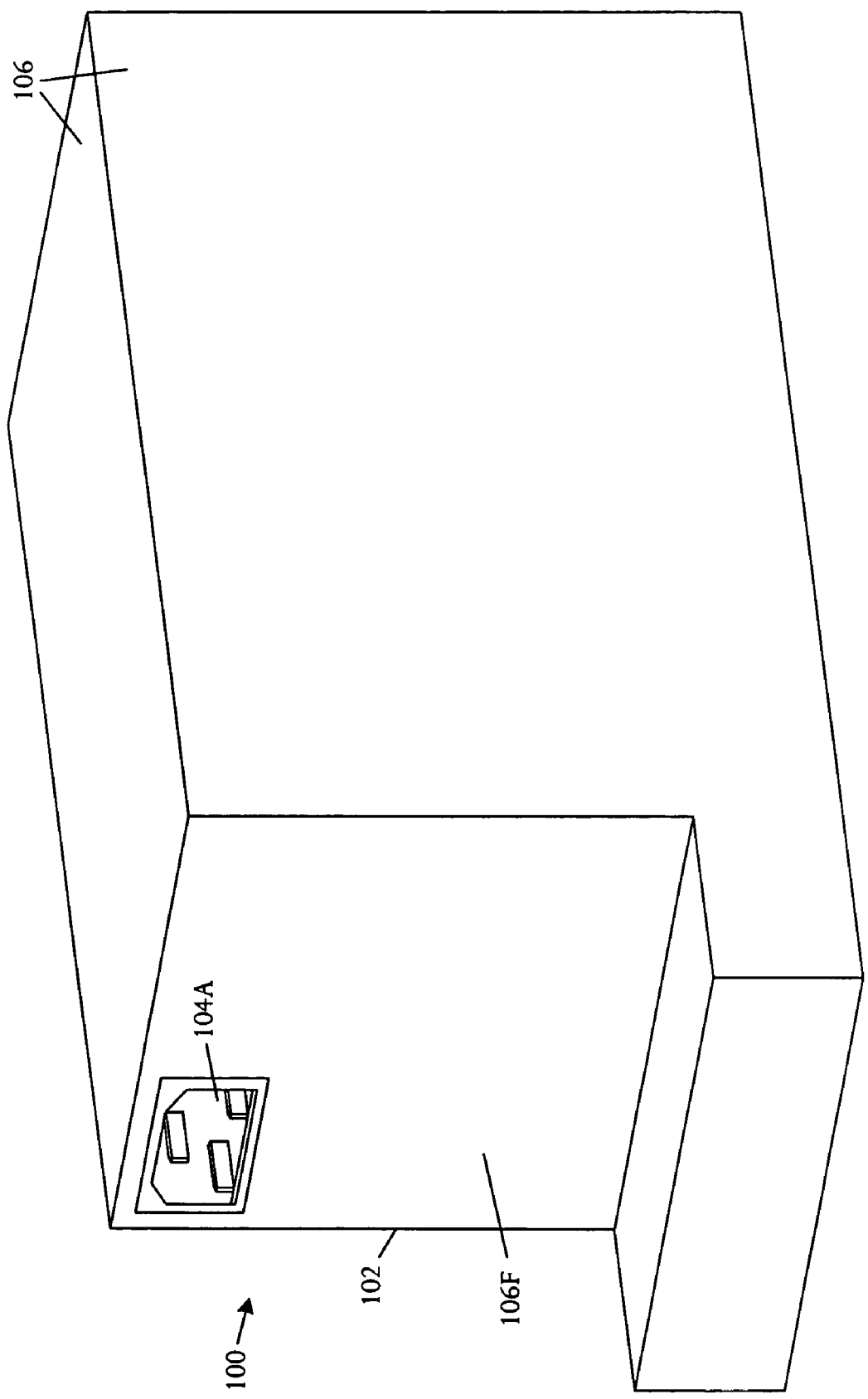
FIGS. 1A and 1B are perspective pictorial diagrams respectively showing front and rear views of a power supply embodiment.
Figure 1B:
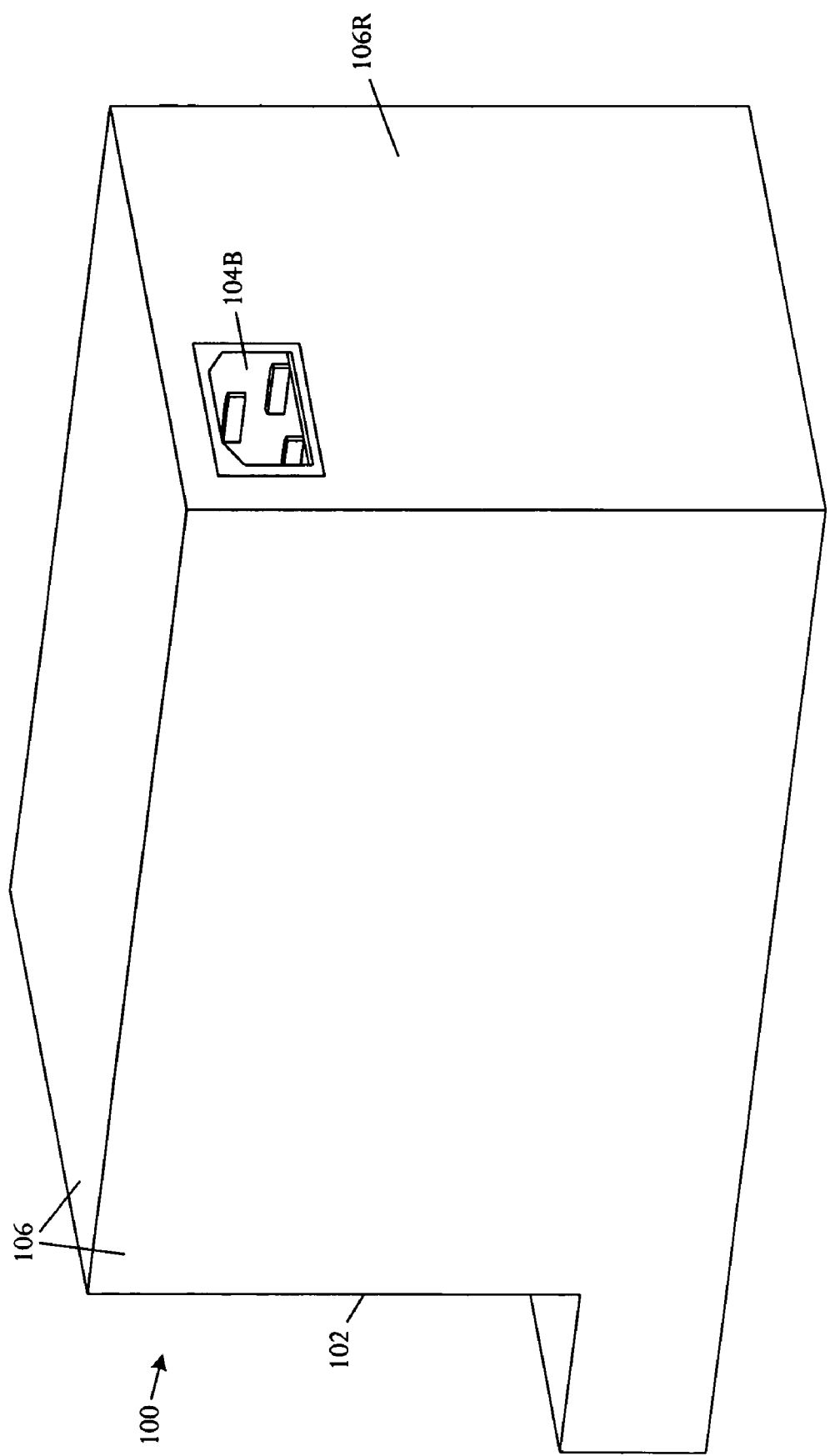

Referring to FIGS. 1A and 1B, perspective pictorial diagrams show front and rear views of a power supply embodiment 100. The power supply apparatus 100 comprises a chassis 102, and a plurality of alternating current (AC) power receptacles 104A, 104B held or retained by the chassis 102.

The chassis 102 has multiple surfaces 106 and the plurality of AC power receptacles 104A, 104B are distributed into at least two of the multiple chassis surfaces. In the illustrative embodiment, the multiple surfaces 106 of the chassis 102 include a front surface 106F and a rear surface 106R. The two AC power receptacles 104A, 104B are respectively formed into the front 106F and rear 106R chassis surfaces.

The illustrative power supply apparatus 100 can be plugged into either the front or back of an electronic system so that the power supply 100 can be an adaptable component in many different system types.

Usage of multiple AC power receptacles 104A, 104B enables leverage of the same power supply across multiple products, reduces supply costs by reducing the number of different parts to be stocked for replacement, and reduces development costs by reducing the number of power supplies to be designed and developed.

In various embodiments, the power supply 100 can be hot-swappable for high-availability to enable quick and simple replacement without powering down the system.

Figure 2A:
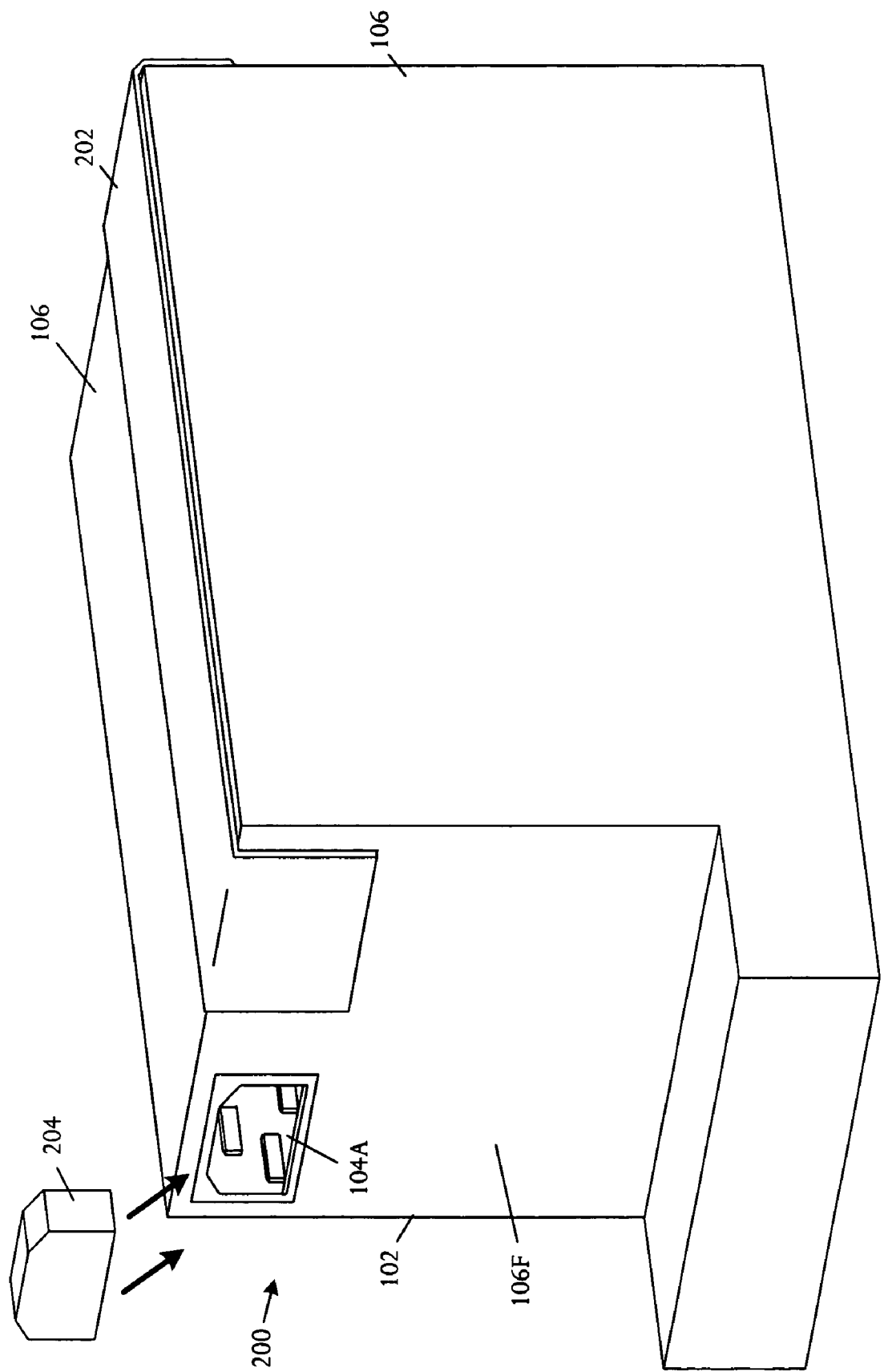
FIGS. 2A and 2B are perspective pictorial diagrams respectively showing front and rear views of a power supply embodiment that includes a cover plate.
Figure 2B:
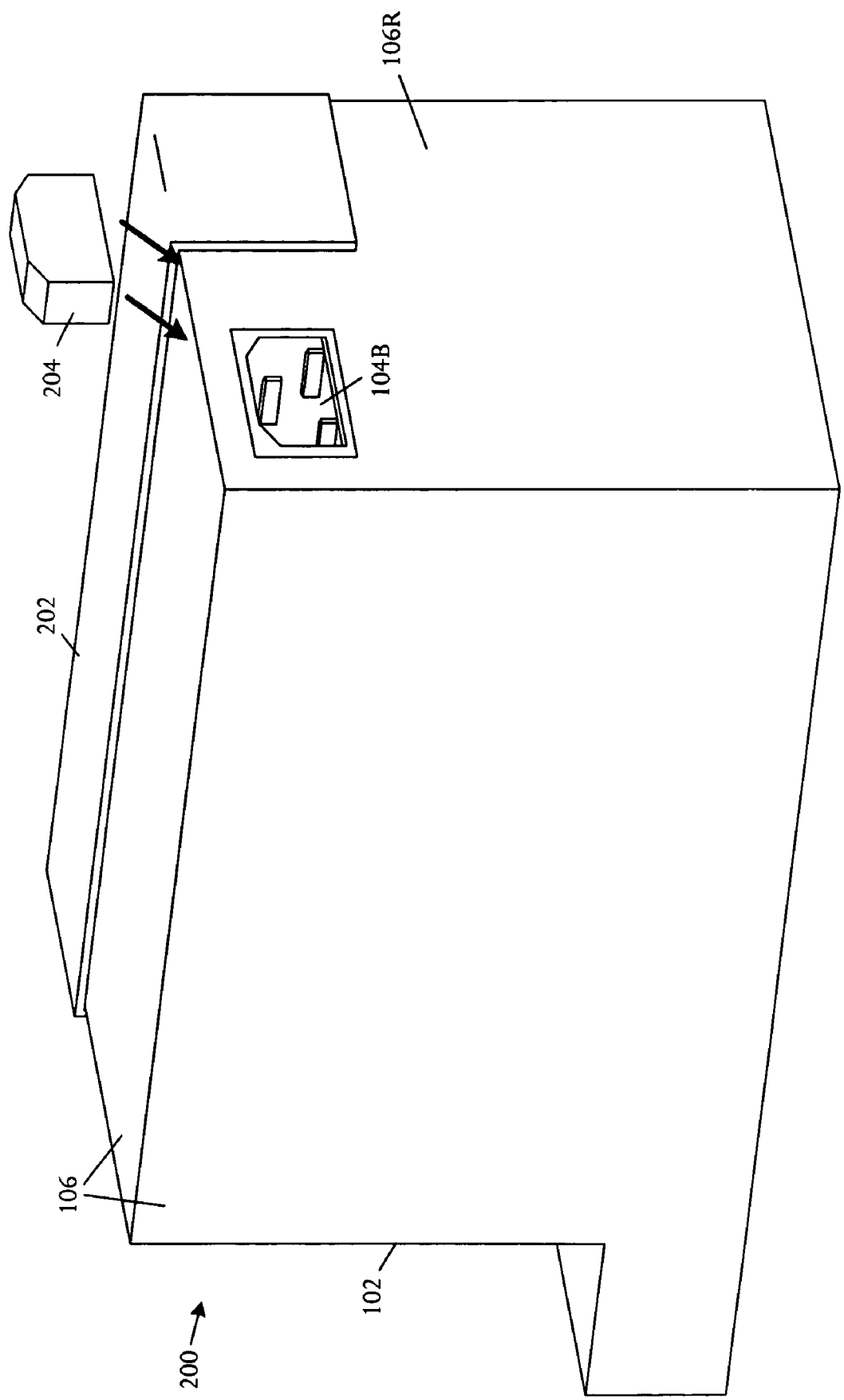

Referring to FIGS. 2A and 2B, perspective pictorial diagrams show front and rear views of a power supply embodiment 200 that includes a cover plate 202. The cover plate 202 is configured to fit over a portion of the chassis 102 and to expose a selected one of the plurality of AC power receptacles while covering other AC power receptacles.

The cover plate 202 can be configured as a sliding cover that covers an unused AC power receptacle to reduce electromagnetic interference (EMI) and the possibility of shock that may occur with exposure of a powered AC input receptacle. The cover plate 202 may be constructed from any suitable material. Examples of cover plate materials typically include various metals, such as sheet metals, and plastics. In one embodiment, the cover plate 202 may be constructed from finger-folded sheet metal with cuts in the metal that enable folding. The cover plate 202 can snap into place on the power supply chassis. In another example, a cover plate can be arranged in the form of a four-bar linkage that covers one receptacle while exposing another.

The cover plate 202 may be configured to include a switch that electrically selects between the various receptacles as the plate physically selects the receptacle. In the illustrative arrangement of power supply and cover plate 202, sliding of the cover plate 202 toggles between AC power receptacles by virtue of positioning of the receptacles.

In some embodiments, the power supply apparatus 200 may include an electromagnetic interference (EMI) gasket 204 that is configured to seal an AC power receptacle that is covered by the cover plate 202. The EMI gasket 204 can be incorporated into a cover plate and function to seal the fissure left by non-insertion of a power plug into the receptacle.

The EMI gasket 204 seals the receptacle fissure and reduces the distance between contacts, for example using EMI protection spring fingers. The power supply with two receptacles potentially can have a fissure or hole in the position of the covered receptacle.

In some embodiments, the EMI gasket 204 can be attached to the cover plate 202 for sliding into place as the cover plate 202 is positioned, thereby reducing conducted emissions. The sliding cover plate 202 seals the exposed receptacle.

In other embodiments, the EMI gasket may be separate from the cover plate so that the gasket is associated with the receptacle rather than the cover plate, avoiding catching of the gasket as the cover plate slides. With the EMI gasket associated with the receptacle rather than the cover plate, the cover plate functions to facilitate sealing of the gasket.

Figure 3A:
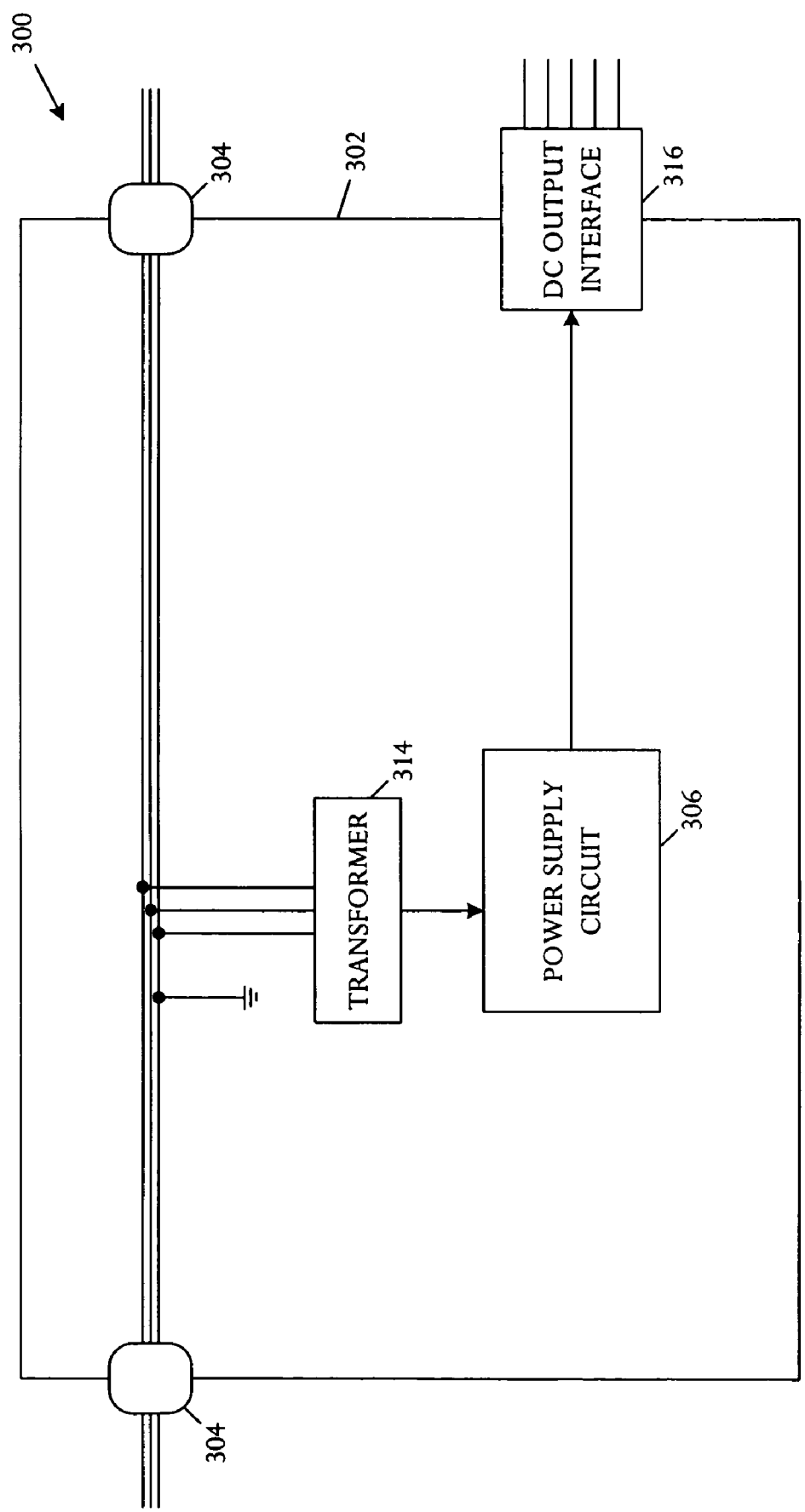
FIGS. 3A and 3B are schematic block diagrams illustrating embodiments of a power supply.

Referring to FIG. 3A, a schematic block diagram illustrates an embodiment of a power supply 300 comprising a chassis 302, a plurality of alternating current (AC) power receptacles 304 formed into the chassis 302, and a power supply circuit 306. The power supply circuit 306 is contained within the chassis 302 and is coupled to a selected AC power receptacle 304.

In the illustrative embodiment, two AC input receptacles 304 are interconnected to form a single input source into the power supply circuit 306 and/or a transformer 314, which form an alternating current/direct current (AC/DC) voltage conversion pathway to one or more lines supplying direct current 316.

A conventional power supply has one AC input power source and power one or more DC output voltages. In contrast, the illustrative power supply 300 includes two or more alternating current (AC) power input receptacles so that power can be applied from different sources. In the illustrative embodiment, power can be supplied both from the rear and from the front of an electronic system. The power supply 300 converts power from alternating current (AC) to direct current (DC) and supplies DC power to the direct current interface 316.

In the embodiment shown in FIG. 3A, the AC power receptacles 304 are simply wired together so that the power supply 300 can be leveraged for multiple various applications at the limited cost of an additional AC input receptacle 304 and some wiring.

Figure 3B:
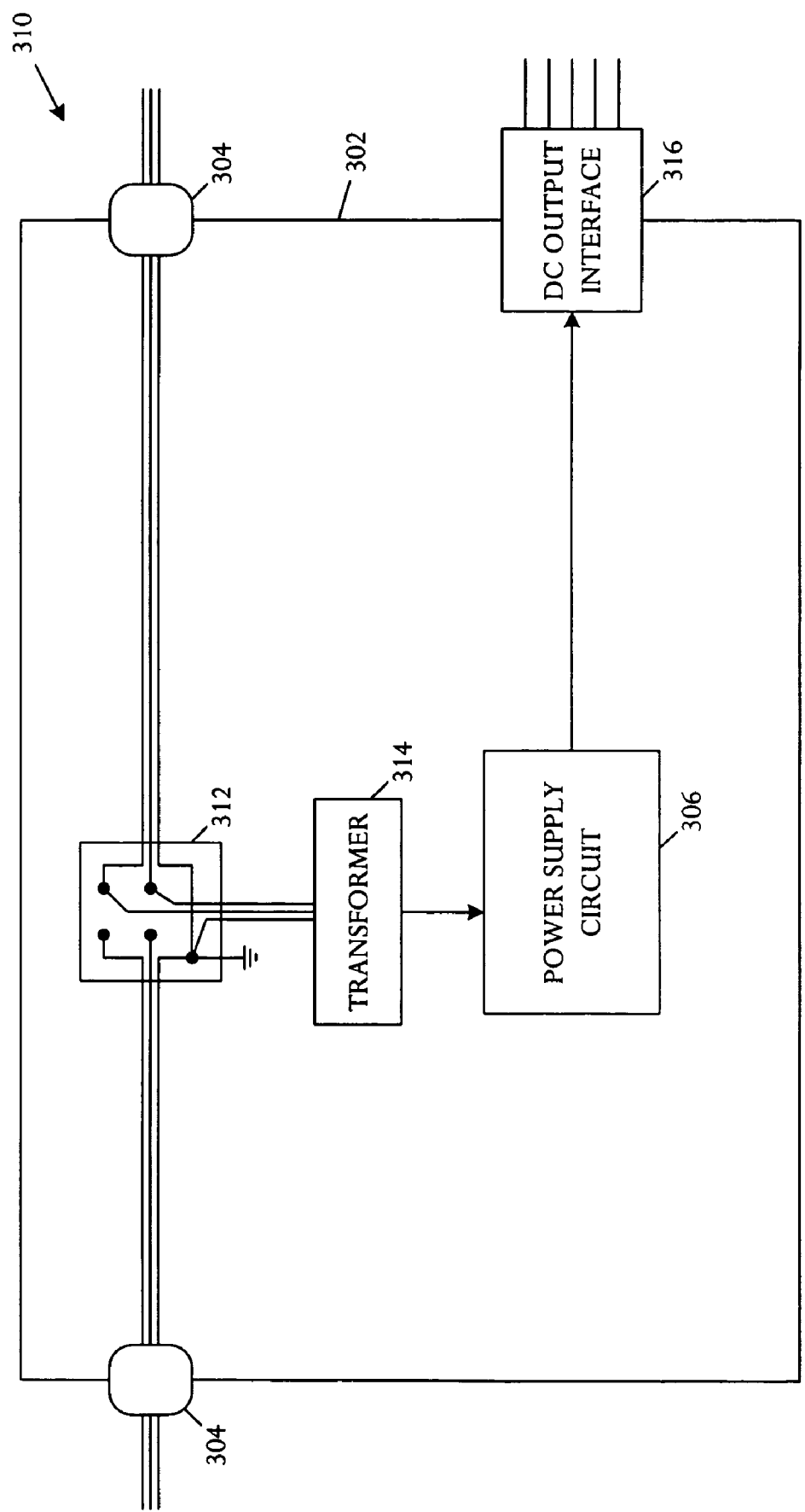

FIG. 3B is a power supply embodiment 310 that includes a very simple circuit, for example a switch 312 coupled between the plurality of AC power receptacles 304 and the power supply circuit 306, to select the active AC input line. The switch 312 selects the AC power receptacle for connection to the power supply circuit 306.

Figure 4A:
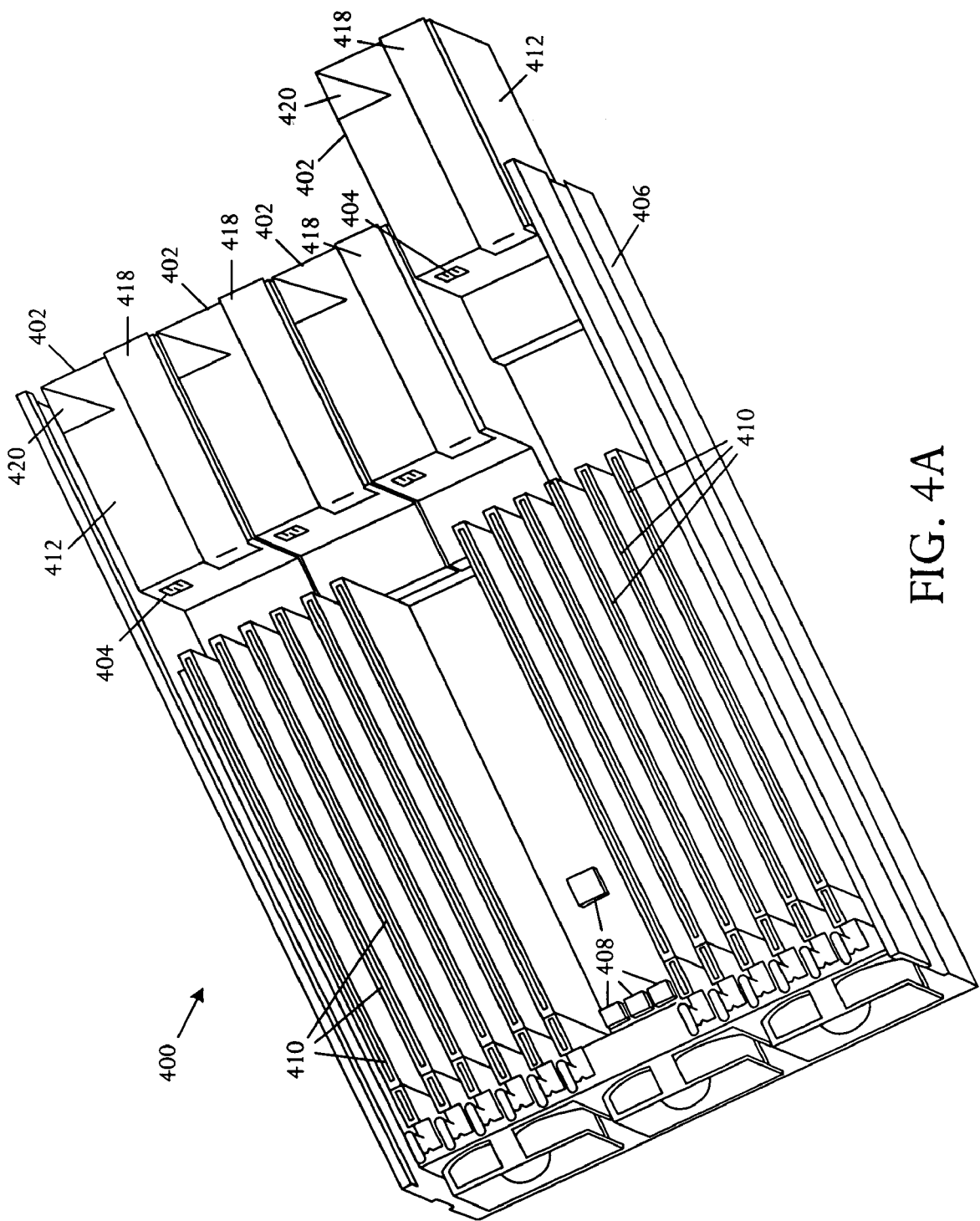
FIGS. 4A and 4B show respective top and side perspective views of the electronic system.
Figure 4B:
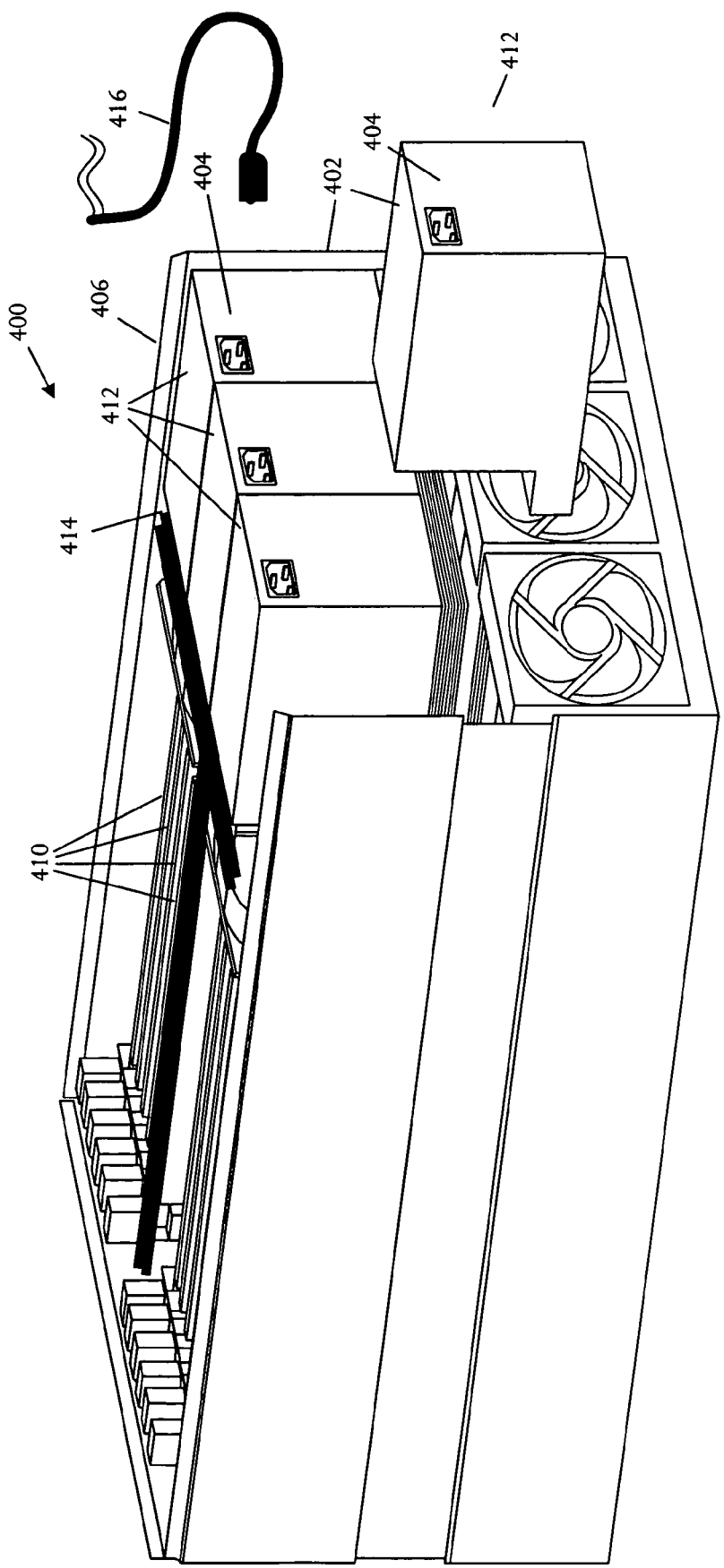
Figure 4C:
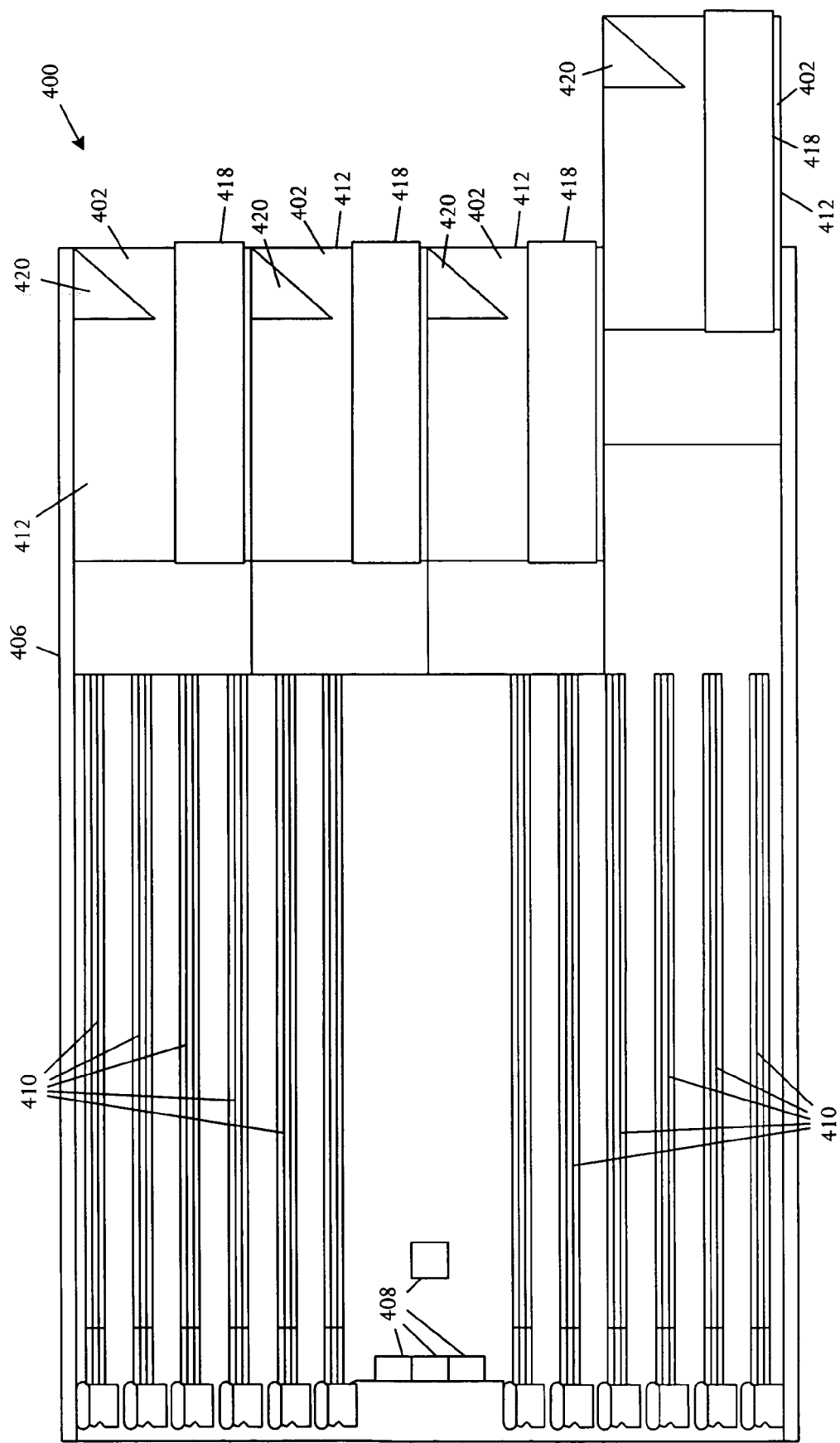
FIG. 4C illustrates a top pictorial view of the electronic system.

Referring to FIGS. 4A, 4B, and 4C, three pictorial diagrams illustrate an embodiment of an electronic system 400 that includes one or more power supplies 402 with multiple alternating current (AC) power receptacles 404. FIGS. 4A and 4B show respective top and side perspective views of the electronic system 400. FIG. 4C illustrates a top pictorial view of the electronic system 400. The electronic system 400 comprises a housing 406, a plurality of electronic circuits 408 and printed circuit boards 410 seated within the housing 406, and at least one power supply 402. One or more of the power supplies can further comprise a chassis 412, a plurality of alternating current (AC) power receptacles 404 formed into the chassis 412 and a power supply circuit contained within the chassis 412 and selectively coupled to a selected AC power receptacle 404.

A power supply 402 is used to power the larger electronic system 400 and in many embodiments is inserted from the front or rear of the housing 406, although entry in any appropriate manner is possible.

The illustrative power supplies 402 are configured for insertion into the housing 406 in an arrangement whereby at least one AC power receptacle is exposed internal to the housing 406 and at least one AC power receptacle is exposed external to the housing 406. The internal AC power receptacles are connected to a power source via a suitable power line, for example, an alternating current (AC) conduit 414 contained within the housing 406 and coupled to an internally-exposed AC receptacle 404. Connection to a power supply via the external AC power receptacles 404 can be made via an alternating current (AC) power cable 416 external to the housing 406 and conduit 414.

In some configurations, the illustrative electronic system 400 includes a power supply embodiment 402 that uses a cover plate 418 configured to fit over a portion of the chassis and to expose a selected one of the plurality of AC power receptacles while covering others of the plurality of AC power receptacles. In an illustrative embodiment, the cover plate 418 may be a snap-in, removable cover that can be used to cover the receptacle not currently in use. As shown in FIG. 3B, the switch 312 may be used in combination with the cover plate 418 and incorporated to disable the unused AC input receptacle electrically.

In some embodiments, for example as shown in FIG. 4A, a guide member 420 can be coupled to the chassis 412 and configured to direct positioning of the cover plate 420. The guide member 420 is configured to move the cover plate 420 into an appropriate position on the chassis 412 to expose the selected AC input receptacle and cover the receptacle that is not selected. In the illustrative power supplies 402, the guide members 420 are formed in the shape of a raised triangle that move the cover plate 420 into the correct position as the power supply 402 slides into place in the electronic system housing 406.

FIG. 4A shows a power supply 402 sliding into the electronic system 400 from the front and symbolically represents the guide member feature 420 that moves the cover plate 418 into the appropriate position. Sliding a power supply 402 into the system 400 from the rear has a similar configuration, although the guide member 420 in the triangular form points in the opposite direction to move the cover plate 418 to the other side of the power supply.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. For example, the AC power receptacles are shown on opposing front and back sides of the power supply. In various embodiments, the receptacles can be placed on any appropriate surfaces of the power supply chassis. The power supply can be in any shape or size and may have any number of receptacles. The cover plate may be in any form.

In the claims, unless otherwise indicated the article "a" is to refer to "one or more than one".

What is claimed is:

1. An electronic system comprising:
   a housing;
   a plurality of electronic circuits and printed circuit boards seated within the housing;
   at least one power supply further comprising:
   a chassis;
   a plurality of alternating current (AC) power receptacles formed into the chassis; and
   a power supply circuit contained within the chassis and selectively coupled to ones of the plurality of AC power receptacles,
   the at least one power supply configured for insertion into the housing in an arrangement whereby at least one AC power receptacle is exposed internal to the housing and at least one AC power receptacle is exposed external to the housing; and
   an alternating current (AC) conduit contained within the housing and coupled to the internally-exposed at least one AC receptacle.

2. The system according to claim 1 wherein the at least one power supply further comprises:
   a switch coupled between the plurality of AC power input receptacles and the power supply circuit that connects a selected AC power input receptacle to the power supply circuit and electrically disables other AC power input receptacles.

3. The system according to claim 1 wherein the at least one power supply further comprises:
   the chassis with multiple surfaces; and
   the plurality of alternating current (AC) power input receptacles distributed into at least two of the multiple chassis surfaces.

4. The system according to claim 1 wherein the at least one power supply further comprises:
   the chassis with multiple surfaces including a front surface and a rear surface; and
   two alternating current (AC) power input receptacles respectively formed into the front and rear chassis surfaces.

5. The system according to claim 1 wherein the at least one power supply further comprises:
   a cover plate that fits over a portion of the chassis to expose a selected one of the plurality of AC power input receptacles while covering others of the plurality of AC power input receptacles.

6. The system according to claim 1 wherein the at least one power supply further comprises:
   a guide member coupled to the chassis configured that directs positioning of the cover plate.

7. The system according to claim 1 wherein the at least one power supply further comprises:
   an electromagnetic interference (EMI) gasket configured to seal an AC power input receptacle that is covered by the cover plate.

8. An electronic system comprising:
   a housing;
   a plurality of electronic circuits and printed circuit boards seated within the housing;
   at least one power supply further comprising:
   a chassis;
   a plurality of alternating current (AC) power receptacles formed into the chassis; and
   a power supply circuit contained within the chassis and selectively coupled to ones of the plurality of AC power receptacles,
   the at least one power supply configured for insertion into the housing in an arrangement whereby at least one AC power receptacle is exposed internal to the housing and at least one AC power receptacle is exposed external to the housing; and
   an alternating current (AC) power cable external to the housing and coupled to the externally-exposed at least one AC receptacle.

9. The system according to claim 8 wherein the at least one power supply further comprises:
   a switch coupled between the plurality of AC power input receptacles and the power supply circuit that connects a selected AC power input receptacle to the power supply circuit and electrically disables other AC power input receptacles.

10. The system according to claim 8 wherein the at least one power supply further comprises:
    the chassis with multiple surfaces; and
    the plurality of alternating current (AC) power input receptacles distributed into at least two of the multiple chassis surfaces.

11. The system according to claim 8 wherein the at least one power supply further comprises:
    the chassis with multiple surfaces including a front surface and a rear surface; and
    two alternating current (AC) power input receptacles respectively formed into the front and rear chassis surfaces.

12. The system according to claim 8 wherein the at least one power supply further comprises:
    a cover plate that fits over a portion of the chassis to expose a selected one of the plurality of AC power input receptacles while covering others of the plurality of AC power input receptacles.

13. The system according to claim 8 wherein the at least one power supply further comprises:
    a guide member coupled to the chassis configured that directs positioning of the cover plate.

14. The system according to claim 8 wherein the at least one power supply further comprises:
    an electromagnetic interference (EMI) gasket configured to seal an AC power input receptacle that is covered by the cover plate.

* * * * *